United States Patent [19]
Dory

[11] 3,756,071
[45] Sept. 4, 1973

[54] PROCESS AND APPARATUS FOR ANALYZING MATERIALS BY MEANS OF ULTRASONIC PULSES, EMPLOYING THE TRANSFER FUNCTION CHARACTERISTIC OF EACH OBSTACLE

[75] Inventor: Jacques Dory, Coupvray, France

[73] Assignee: Realisations Ultrasoniques, Meaux, France

[22] Filed: Mar. 1, 1971

[21] Appl. No.: 119,474

[30] Foreign Application Priority Data
June 6, 1969 France .............................. 6918664

[52] U.S. Cl. .............................................. 73/67.8
[51] Int. Cl. ........................................... G01n 29/04
[58] Field of Search .............................. 73/67.5–67.9

[56] References Cited
UNITED STATES PATENTS

| | | | |
|---|---|---|---|
| 2,618,968 | 11/1952 | McConnell | 73/67.7 |
| 2,800,789 | 7/1957 | Henry | 73/67.8 |
| 3,335,602 | 8/1967 | Martner | 73/67.8 |
| 2,848,891 | 8/1958 | Hunter, Jr. et al. | 73/67.5 |
| 3,332,278 | 7/1967 | Wood et al. | 73/67.5 |

OTHER PUBLICATIONS

Gericke "Determination of Geometry of Hidden Defects by Ultrasonic Pulse Analysis Testing" in Journal of Acoustical Society, Vol. 35, No. 3, March 1953.

Gericke "Dual–Frequency Ultrasonic Pulse–Echo Testing" in Journal of the Acoustical Society, Vol. 36, No. 2, Feb. 1964 pg. 313–322.

*Primary Examiner*—Herbert Goldstein
*Attorney*—William Anthony Drucker

[57] ABSTRACT

For analysing an obstacle which perturbs the propagation of ultrasonic waves in a medium in particular a flaw in a mechanical part, an apparatus is provided, which comprises transmitter and transducer units directing towards the obstacle a beam of ultrasonic pulsed waves comprising a plurality of frequency components and a receiver with cathode-ray tube displaying the relative amplitudes of the respective frequency components in the ultrasonic energy reflected from the obstacle. The apparatus provides accurate information as regards the position shape and dimensions of the obstacle.

6 Claims, 8 Drawing Figures

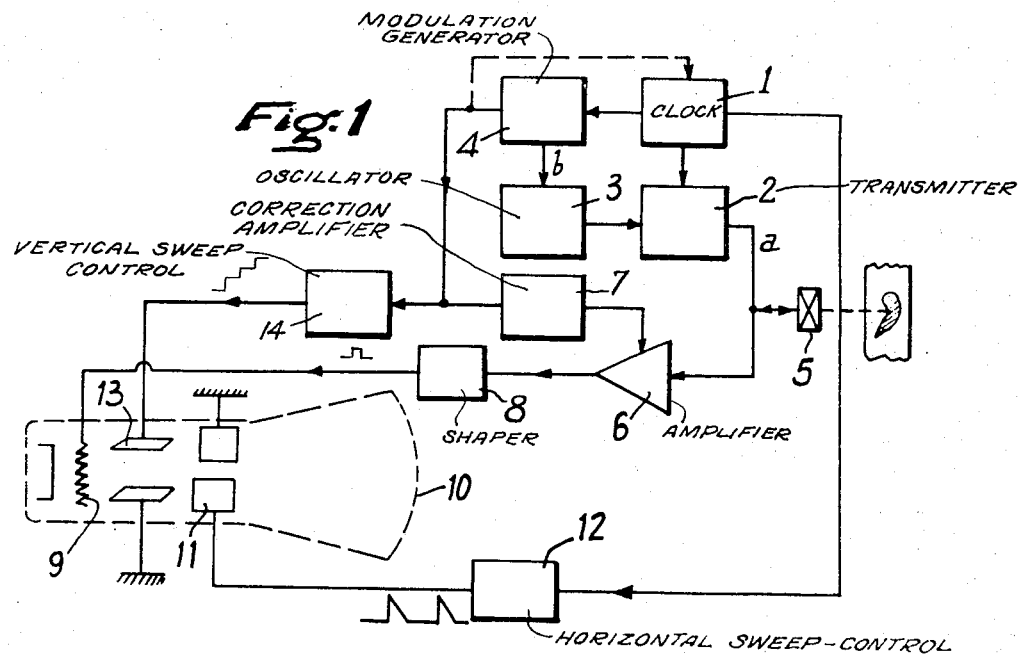
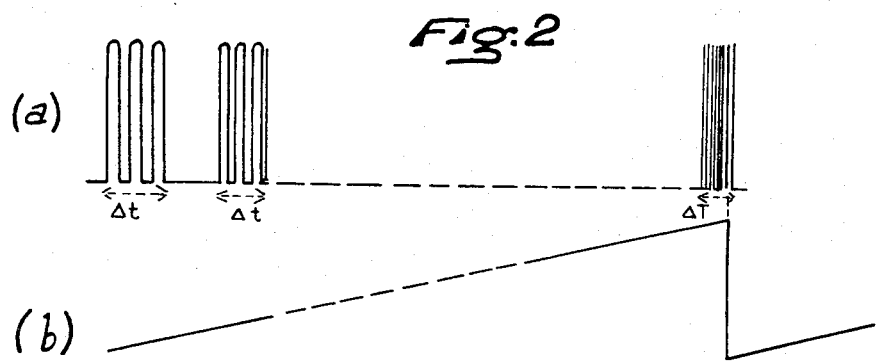
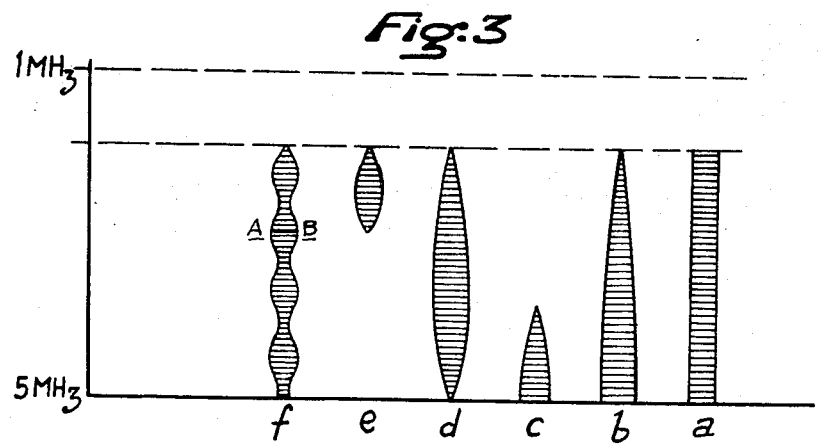

PROCESS AND APPARATUS FOR ANALYZING MATERIALS BY MEANS OF ULTRASONIC PULSES, EMPLOYING THE TRANSFER FUNCTION CHARACTERISTIC OF EACH OBSTACLE

The present invention relates in a general way to the analysis of the discontinuities or obstacles which perturb the propagation of acoustical waves in a given medium.

It is known that the presence of obstacles in the path of an acoustical wave gives rise to phenomena of reflection, refraction and diffraction. Two types of known analyzing methods are derived from this: the method known as the "reflection" method which is the most commonly employed, and the "transmission" method. In order to simplify the ensuing description, reference will be made solely to the method employing the reflection of pulses. However, it must be understood that the invention is also applicable to the transmission method.

The object of the analysis is generally to determine, with the highest possible precision, the position, shape and dimensions of the obstacles.

Thus, it can concern the measurement of thicknesses, levels or distances, or the detection of obstacles and the study of their nature and characteristics. Hereinafter, reference will be made more particularly to the detection and examination of flaws in mechanical parts, namely what is usually termed nondestructive inspection. However, it must be understood that the scope of the invention is not intended to be limited to this type of applications.

Known nondestructive inspection apparatuses employing ultrasonic echoes usually give only a rough estimate of the size of the flaw. Indeed, they are restricted to the measurement of the intensity of the acoustical energy reflected in the direction of the receiver probe (the latter usually also performs the function of a transmitter and this could be the case in the present invention), most often by displaying on the screen of a cathode-ray tube having a horizontal deflection which is proportional to time, the amplitude of the flaw echoes.

This method is based on the very rough hypothesis that the intensity of the echo depends only on the dimensions of the obstacle. This leads to considerable errors, in particular as soon as the orientation of the obstacle relative to the ultrasonic sounding beam substantially deviates from the perpendicular. In practice, the conventional method in no way attempts to achieve a precise determination of the dimensions and shape of the obstacles.

The object of the present invention is to provide an analyzing process which employs ultrasonic echoes and is capable of achieving such a determination.

The process of the invention comprises mainly directing towards the obstacle to be analyzed acoustical pulses, or groups of acoustical pulses comprising a plurality of components of different frequencies, and analyzing the relative amplitudes of the different frequency components of the echo received by the sounding probe from said obstacle, preferably by reference to relative amplitudes of different frequency components of the echoes from at least one reference obstacle, said reference obstacle advantageously having large dimensions and an orientation normal to the ultrasonic analyzing beam.

These relative amplitudes of the different frequency components of the echo formed on a given obstacle constitute as a rule what will be termed the "transfer function" of said obstacle. This transfer function has a characteristic shape for each type of obstacle (depending, in particular, on the shape, dimensions and orientation of the latter). However, as the characteristics of the probe (power efficiency and directivity diagram) can themselves vary with the frequency and consequently have a parasite influence on the relative amplitudes of the different frequency components of the echo formed on the obstacle, it would be advantageous in many cases to eliminate this parasite influence by acting on certain parameters of the electronic receiver circuits receiving the echoes in such manner that the relative amplitudes of the different frequency components of the output signal of said circuits obtained by the reception of the echo formed on a reference obstacle, obey a predetermined law simple enough to take into account and effect a correction, whereby the exact transfer function of any obstacle can be ascertained.

The practical realization of the process according to the invention can comprise a large number of embodiments which differ from each other appreciably.

The ensuing detailed description concerns mainly two preferred embodiments, given by way of illustration.

In the accompanying drawing:

FIG. 1 is the block diagram of an apparatus according to a first embodiment of the invention;

FIGS. 2–4 and 7 and 8 illustrate the operation of this apparatus;

Figure 4:
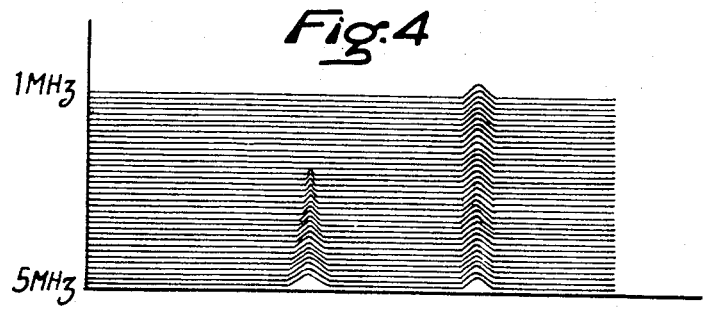

FIG. 1 shows a clock 1 which drives a transmitter 2 transmitting brief repetitive electrical signals each of which has the shape of a group of high-frequency oscillations. These oscillations are furnished by an oscillator 3 which is frequency modulated by a generator 4 also driven by the clock 1.

The brief repetitive signals which are sent out by the transmitter 2 and excite a transmitter-receiver-transducer 5 will be designated hereinafter "sounding pulses."

Shown in FIG. 2 is the wave form (a) of these pulses as a function of the modulating signal (b) furnished by the generator 4.

It has been assumed, by way of example, that the signal (b) has the form of a sawtooth capable of varying the frequency of the oscillator between a minimum value of 1 MHz and a maximum value of 5 MHz. The transmitter 2 converts this modulated high frequency oscillation into pulses (a). Each of the latter contains a variable plurality of oscillations and their width t is constant and very small relative to the modulation period (there are for example 100 pulses per modulation period, said period lasting 100 ms; these figures are not intended to be limitative). In the considered example, the frequency varies linearly 40 KHz from one pulse to the next. Any other law of variation of the frequency could be adopted. In FIG. 2a, only three pulses have been shown, each at an enlarged scale for the sake of clarity. It is seen that the successive pulses contain an increasing number of oscillations as the frequency increases.

One skilled in the art would be capable of designing the elements 1–4. Consequently, only a purely symbolic representation thereof has been given. The oscillator 3 could, moreover, be frequency modulated directly by the clock 1.

The ultrasonic echoes formed on the obstacles to be analyzed and on the reference obstacle (for example constituted by the "end" of the part in the case of the inspection of flaws) are received by the probe 5 and the electrical signals resulting therefrom are amplified by an amplifier 6.

A correction amplifier 7 having an amplitude response curve which obeys a predetermined non-linear law, produces from the voltage issuing from the modulation generator 4 a voltage applied at a point of the circuits of the amplifier 6. The effect of this voltage is to vary the gain of the amplifier 6 in accordance with a predetermined law as a function of the frequency of the sounding pulses. This law is advantageously such that, for the reference obstacle (which has a large size and is perpendicular to the ultrasonic sounding beam), the output signal of the amplifier 6 has a constant amplitude for all the sounding frequencies.

When such a correction has been made, it can be shown that an obstacle of small dimensions relative to the section of the beam and oriented perpendicularly to the latter, results in a signal whose amplitude diminishes for the lowest sounding frequencies, this reduction in amplitude being moreover the greater as the dimension of the obstacle is smaller. For an obstacle also of small size but inclined relative to the beam, the amplitude of the output signal of the amplifier 6 passes through a maximum which depends both on the dimension of the obstacle and on its inclination.

This automatic correction of the gain of the receiver-amplifier 6 finally enables the transfer function pertaining to the obstacle analyzed to be isolated from the parasite influence of variations, as a function of the sounding frequency, in the characteristics of the probe (such as the power efficiency and directivity diagram). It must be understood that other types of correction for eliminating this parasite influence could be contemplated.

The signals issuing from the amplifier 6 pass into a shaping circuit 8 which effects thereon in the known manner an integration followed by a clipping so as to produce rectangular signals whose width is proportional to the amplitude of the signals from the amplifier 6.

These rectangular signals are applied to the light intensity control electrode 9 of a cathode-ray tube 10.

The horizontal sweep of the screen of this cathode-ray tube (plates 11) is controlled by a sawtooth voltage generator 12 synchronized by the clock 1. Consequently, each horizontal sweep starts with the transmission pulse. Conventional means (not shown) are moreover generally provided so that only the first echoes of each sounding cycle are displayed on the screen.

The vertical sweep (plates 13) is controlled by a generator 14 synchronized by the modulation voltage. This generator advantageously produces a step voltage each of the steps of which corresponds to a different horizontal sweep. This step voltage is regulated in such manner that the horizontal sweep line undergoes a translation corresponding to the entire height of the screen when the carrier frequency passes from one extreme value to the other.

In the course of a given horizontal sweep, the echo is displayed in the form of a horizontal line of light (AB, FIG. 3) which has a length proportional to the amplitude of the output signal of the amplifier 8. The distance from point A to the left edge of the screen (starting point of the sweep) is proportional to the distance between the probe and the obstacle.

In the course of the modulation period, this horizontal line moves whereas its width varies as a function of the ordinate. There is thus displayed (provided that the cathode-ray tube has sufficient remanence) a vertical band which furnishes a representation of the transfer function of the obstacle. It is sufficient for this purpose that the reference obstacle produce a band of simple form with which the band produced by the other obstacles can be readily compared. In the presently described embodiment, it will be clear that the band corresponding to the reference obstacle will have a constant length (form $a$, FIG. 3).

The band $b$ represents an obstacle of average dimensions perpendicular to the beam; in this case, the amplitude of the reflected signal increases when the frequency increases.

The band $c$ represents a very small obstacle: the energy reflected at the lowest frequencies does not reach the detection threshold of the receiver.

The band $d$ represents an inclined obstacle of moderate dimensions. At low frequencies, the energy reflected is very weak owing to the small size of the obstacle relative to the wavelength; it increases when the frequency increases. In respect of the highest frequencies, the directivity of the reflecting source becomes such that energy is no longer returned to the probe.

The figure $e$ represents an obstacle which is still further inclined.

A thorough mathematical study of the exact form of the transfer functions relating to the real obstacles is of course difficult, but it is possible to draw up a catalogue of images given by characteristic obstacles which enables the latter to be rapidly identified when they appear on the screen.

A particular case is that of obstacles very close to each other and therefore located at distances from the probe which differ only slightly so that there is interference between the reflected pulses. In this case, the end of the pulse reflected by the nearer obstacle is superimposed on the beginning of that corresponding to the remoter obstacle; according to the relative phase of the carrier waves, this interference is manifested by an increase or decrease in the amplitude of the echoes in the common zone.

When the sounding frequency varies, there is thus observed a series of maxima and minima which are manifested on the screen by a width modulation of the band (FIG. 3); the vertical distance between two maxima enables in this case the distance between two obstacles to be calculated in a very precise manner. This technique can be of interest in the case of the measurement of the thickness of walls.

An improvement in the apparatus shown in FIG. 1 consists in replacing entirely or partly the modulation of the light intensity of the beam of the cathode-ray tube by a modulation of small amplitude superimposed on the modulation of the vertical deflection proportional to the frequency. In other words, in this modification, the output signal of the amplifier 6 is, after suitable attenuation, applied to the plates 13. There is then obtained on the screen an effect of relief (FIG. 4: the band representing each obstacle then appears in relief)

whose general appearance reveals in a striking manner the internal structure of the material examined.

Another improvement consists in varying both the rate of the sounding pulses and their carrier frequency (for this it is sufficient to feed back the modulation voltage to the clock; this has been symbolically represented in FIG. 1 by a dot-dash line connection between the output of the element 4 and the clock).

Indeed, the rate of the pulses must be as high as possible if it is desired to obtain a stable readily-observed image while retaining a sufficient number of exploration lines which are necessary for a good definition of the image without employing special cathode-ray tubes or complex memory circuits.

Now, the rate is limited by the existence of so-called repetitive echoes which occur when a sounding pulse is sent out before the corresponding echoes of the preceding transmission, which have for origin multiple reflections in the sounded part, are sufficiently attenuated.

Owing to the absorption characteristics of the materials sounded, the waves are attenuated quicker as their frequency is higher. The rate therefore advantageously increases with increase in the carrier frequency of the pulses.

In the absence of this improvement, it would be necessary to choose a rate corresponding to the lowest of the frequencies employed and this rate might be rather low.

Another improvement in the apparatus shown in FIG. 1 consists in incorporating in the shaping circuit 8 a selecting element connected to the output of the receiver amplifier 6 and capable of eliminating the leading and trailing edges of the pulse received.

Figure 7:
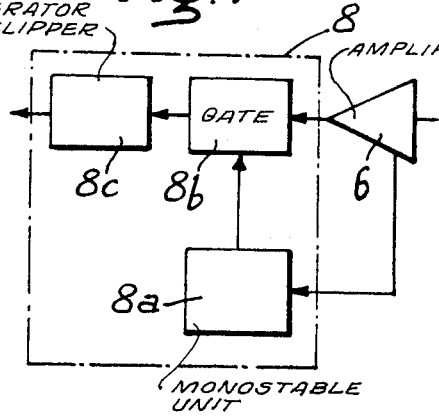

Such an element has been shown diagrammatically in FIG. 7. It comprises for example a monostable multivibrator 8a triggered by the leading edge of the pulse from the amplifier 6 after a brief delay $\Delta t$ furnished by an RC circuit included in the multivibrator 8a. The latter produces a pulse of constant width which opens a gate 8b during its duration.

Figure 8:
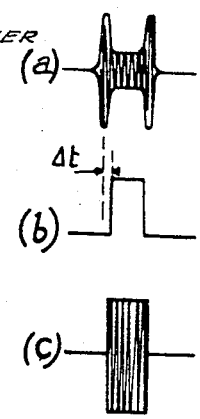

FIG. 8 shows at (a) a pulse received after reflection on an obstacle which reflects only a part of its frequency spectrum. It can be seen that this pulse comprises transient disturbances at its end and beginning. Such disturbances occur when the variable-frequency transmission pulse has a spectrum provided with lateral bands and when the obstacle reflects the frequencies of said lateral bands in a preferential manner.

The pulse generated by the multivibrator 8a is shown at (e). It can be seen that its duration has been so predetermined that the pulse (c) transmitted to the integrator and clipper circuit 8c has the transient disturbances remove therefrom so that the performance of the apparatus is improved.

The selection element 8a, 8b can be omitted if the transducer is chosen in such manner that the lateral bands of the transmission pulse are small.

A modification of the apparatus shown in FIG. 1 consists (retaining if desired the display elements) in sending the output signal from the amplifier 6 directly to a calculator which is suitably programmed and capable of directly furnishing the data corresponding to the dimension and orientation of each obstacle.

Instead of frequency modulating the carrier wave of the repetitive pulses, there could be employed as the sounding signals repetitive pulses which are rich in harmonics, the deformations of these signals being analyzed after reflection on an obstacle.

Figure 5:
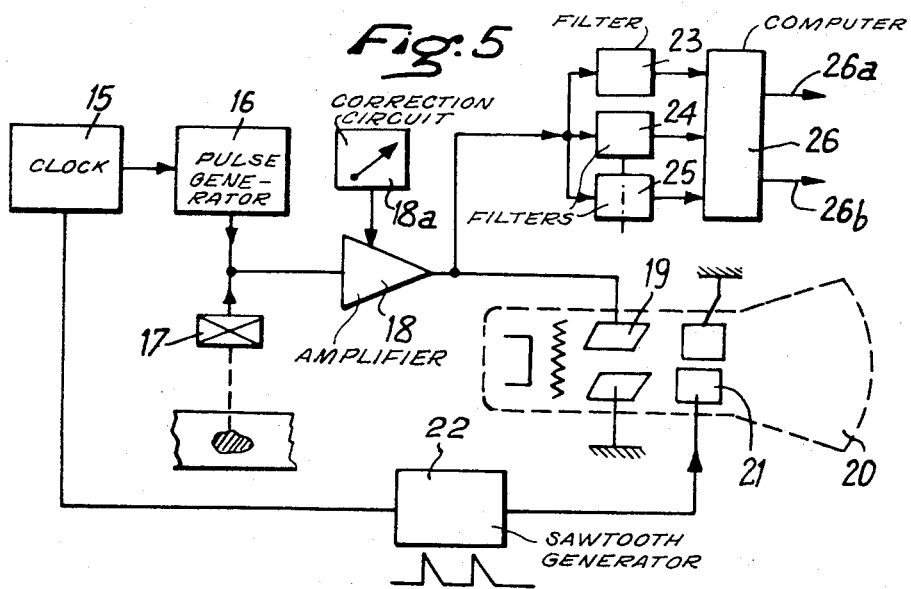
FIG. 5 shows a modification of the invention.

A system for carrying out such a process has been shown diagrammatically in FIG. 5.

The horizontal deflection (plates 21) of the cathode-ray tube 20 is controlled by a sawtooth generator 22 synchronized by the clock 15 which moreover, synchronizes the generator 16 of the repetitive signals which are rich in harmonics (for example rectangular pulses). These signals excite the probe 17 and the echoes, after amplification at 18, are sent to the vertical deflection plates 19 of the cathode-ray tube.

According to an important feature of the invention, the amplitude-frequency response curve of the amplifier 18 is regulated by means of an adjustable correction circuit 18a in such manner that the reference obstacle is displayed on the screen in the form of a rectangular pulse.

The other obstacles therefore give representations which vary according to their dimension and orientation and are easy to identify.

Figure 6:
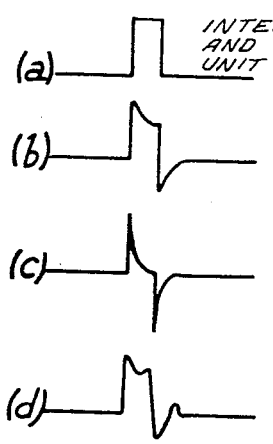
FIG. 6 illustrates the operation of this modification.

For example, an obstacle of small size produces on the screen a signal deformed by differenciation of the initial pulse $a$ (FIG. 6). Such a signal is shown at $b$ (FIG. 6) for a small obstacle and at $c$ and for even smaller obstacle. In respect of an inclined obstacle, there is observed a phenomenon of rebound and a rounding of the edges of the rectangular signal owing to the loss of its low-and high-frequency components ($d$, FIG. 6).

In the case of an automatic inspection, the signals from the amplifier 18 could pass into a frequency analyzer system comprising, for example, a number of filters (23, 24, 25) each having a narrow frequency band and connected in parallel; the signals issuing from this analyzer could then be fed into a numerical or analogic calculating circuit (26) adapted to compute the relative amplitudes and phases of the various components and finally to furnish directly the information concerning the dimension (terminal 26a) and the orientation (terminal 26b) of the obstacle. Preferably, instead of regulating the amplitude-frequency response of amplifier 18 by means of correction circuit 18a, one will connect an adjustable attenuator (not shown) at the output of each of the filters 23 – 24, etc. The respective attenuators will be individually adjusted for obtaining a substantially uniform spectrum for the echo signal which corresponds to the above-mentioned reference obstacle.

Another modification of the device shown in FIG. 5 consists in detecting the respective output of the filters 23 – 24, etc., in storing the detected outputs in a plurality of condensers, and in sequentially switching the voltages across the said condensers on the vertical deflection plates 19 of the oscilloscope 20.

It must be understood that various other modifications of the process and apparatus described could be imagined by one skilled in the art without departing from the spirit of the invention. In particular, it is possible to employ several probes which cross their beams on the obstacle so as to analyze the dimension of the projections of the obstacle in several directions.

I claim:

1. An apparatus for analyzing discontinuities or obstacles which perturb the propagation of acoustical waves in a given medium, comprising means for directing towards the obstacles to be analyzed a beam of waves corresponding to brief acoustical signals transmitted in repetitive groups and having a carrier frequency which varies in accordance with a predetermined law within anyone of said groups; receiver means for receiving the said signals after propagation into the medium along a path containing the obstacles, the received signals comprising a plurality of different frequency components, said receiver means comprising means for automatically correcting the frequency response curve thereof to provide output signals of constant amplitude when it receives the signals formed on a reference obstacle; said apparatus further comprising display means with vertical deflection and horizontal deflection, means synchronizing the horizontal deflection with the respective transmitted signals, means synchronizing the vertical deflection with the variation of the carrier frequency, whereby a visual representation of the received signals is formed by line-by-line sweeping, and means for modulating a parameter which is characteristic of the display as a function of the amplitudes of the said received signals.

2. An apparatus as claimed in claim 1, wherein said visual representation is obtained on the screen of a cathode-ray tube, said characteristic parameter of the display being the light intensity modulated in an all-or-nothing way by said signal which is a function of the intensity of the signals received.

3. Apparatus as claimed in claim 2, wherein said signal which is a function of the amplitude of the signals received is a rectangular signal having a width proportional to said intensity.

4. An apparatus as claimed in claim 1, wherein said visual representation is obtained on the screen of a cathode-ray tube, said parameter characteristic of the display being the vertical deflection voltage of said cathode-ray tube which is modulated by a signal having an amplitude proportional to that of said signals received.

5. An apparatus as claimed in claim 1, further comprising means for increasing the recurrent frequency of said repetitive groups as their carrier frequency increases.

6. An apparatus as claimed in claim 1, wherein said receiver means comprise shaping means adapted for eliminating the leading and trailing edges of the received signals.

* * * * *